Dec. 23, 1969 R. S. FEEBACK 3,485,221

OMNITORQUE OPPOSED PISTON ENGINE

Filed Dec. 11, 1967 7 Sheets-Sheet 1

INVENTOR.

Ralph S. Feeback

BY Van Valkenburgh & Lowe

ATTORNEYS

Dec. 23, 1969 R. S. FEEBACK 3,485,221

OMNITORQUE OPPOSED PISTON ENGINE

Filed Dec. 11, 1967 7 Sheets-Sheet 2

INVENTOR.
Ralph S. Feeback
BY Van Valkenburgh & Lowe
ATTORNEYS

Dec. 23, 1969 R. S. FEEBACK 3,485,221

OMNITORQUE OPPOSED PISTON ENGINE

Filed Dec. 11, 1967 7 Sheets-Sheet 3

INVENTOR.
Ralph S. Feeback
BY Van Valkenburgh & Lowe
ATTORNEYS

OMNITORQUE OPPOSED PISTON ENGINE

Filed Dec. 11, 1967 7 Sheets-Sheet 4

INVENTOR.
Ralph S. Feeback
BY Van Valkenburgh & Lowe
ATTORNEYS

INVENTOR.

Ralph S. Feeback

BY Van Valkenburgh & Lowe

ATTORNEYS

INVENTOR.
Ralph S. Feeback
BY Van Valkenburgh & Lowe
ATTORNEYS

INVENTOR.
Ralph S. Feeback
BY Van Valkenburgh & Lowe
ATTORNEYS

United States Patent Office 3,485,221
Patented Dec. 23, 1969

3,485,221

OMNITORQUE OPPOSED PISTON ENGINE

Ralph S. Feeback, 217 Bradshaw Drive, Sanford, Fla. 32771

Filed Dec. 11, 1967, Ser. No. 689,499
Int. Cl. F02b 25/08, 75/28
U.S. Cl. 123—51 12 Claims

ABSTRACT OF THE DISCLOSURE

This disclosure concerns an opposed piston engine wherein a cylinder is provided with a crankcase at each end and a crank rotatably mounted within each crankcase to operate the opposed pistons. The cranks are geared together so that the pistons function in unison with one piston being approximately 90 degrees ahead of the other in its cyclic movements.

With such an arrangement, the chamber within the cylinder between the piston, which reciprocably changes in volume, may be arranged to operate in a manner advantageous to sustain high torque output on the shafts. The unit may be adapted for operation with steam or compressed air or as a two-cycle or four-cycle internal combustion engine. The unit may operate with intake and exhaust ports which are opened and closed by piston movement without the need for valves. It may also advantageously operate with valves in the intake and/or the exhaust. Such valves are arranged in a manner conventional to the construction of two-cycle or four-cycle internal combustion engines.

This invention relates to reciprocating engines, and more particularly to reciprocating engines of the type having supplementary parallel crankshafts, each with its pistons opposing the pistons of the other in common cylinders. As such, the invention will be hereinafter referred to as an "Omnitorque Opposed Piston Engine," and sometimes as an "Opposed Piston Engine."

A primary object of the invention is to provide an novel and improved opposed piston engine, wherein the rotation of one crankshaft is phased to lag the rotation of the other by approximately 90 degrees to enhance the operative, cyclic action of the prime mover gas within the cylinder chambers between the pistons and to an improved sustained torque output with a substantial reduction in vibration producing effects.

Another object of the invention is to provide a novel and improved omnitorque opposed piston engine which may be operated as a compressed air engine, a steam engine or as an internal combustion engine of either the two or four cycle type.

Another object of the invention is to provide a novel and impoved opposed piston engine having the rotation of its crakshafts uniquely phased to provide, in the reciprocable movement of the piston, a shifting of the gas charge between the pistons across the cylinders in a manner which permits the engine to be fully operative without valves and camming mechanisms by the mere expedient of providing ports at selected locations in the cylinder walls.

Another object of the invention is to provide a novel and improved opposed piston engine which may also advantageously combine cylinder wall ports and valves in effective and efficient arrangements for the operation of the engine.

Another object of the invention is to provide a novel and improved omnitorque opposed piston engine wherein the rotation of the crankshafts is phased so that one shaft leads the other in a manner which produces a sequence of volumetric variation in each cylinder between opposing pistons, which may be correlated with operative cycles required for compressed air, steam or the internal combustion of gas to produce an efficient output with a sustained torque on the drive shaft.

Another object of the invention is to provide a novel and improved omnitorque opposed piston internal combustion engine wherein the rotations of the crankshafts are phased with one shaft leading the other to produce a sequence of volumetric variations which establish the operative cycles of the engine, and also includes in one arrangement a significant delay following completion of the work cycle before releasing the exhaust gas to permit the pressurized gas to burn the unspent and incompletely combined fuel, and thereby eliminate the need to provide an exhaust after-burner where it is necessary to minimize the undesirable effects from exhaust gases.

Another object of the invention is to provide in a novel and improved omnitorque opposed piston engine of the internal combustion engine type, means for varying the compression ratio during operation of the engine to better and more completely burn any type of fuel available.

Further objects of the invention are to provide a novel and improved omnitorque opposed piston engine which is simple in its basic form, may be manufactured with conventional, readily available components with a minimum of special machining operations, and is a low-cost, neat appearing, rugged and durable unit.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawings, in which:

Figures 1, 2, 3:
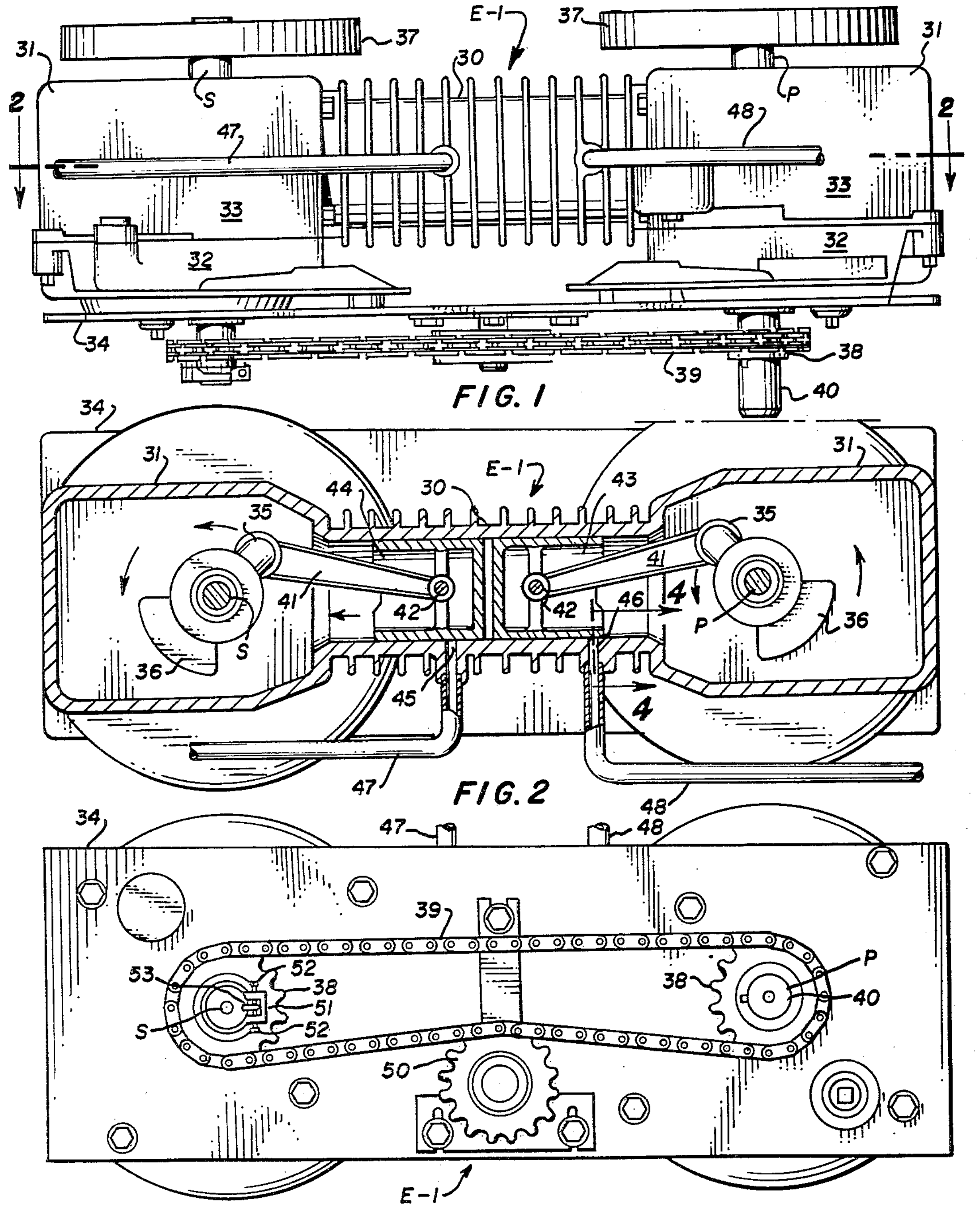
FIGURE 1 is a side elevational view of a single cylinder opposed piston engine built according to the principles of the invention and arranged for operation with steam or compressed air.
FIGURE 2 is a sectional plan view as taken from the indicated line 2—2 at FIG. 1 and with pistons positioned as being prior to the commoncement of a work cycle.
FIGURE 3 is a bottom view of the engine shown at FIG. 1 to illustrate one mode of interconnecting the parallel, spaced-apart driveshafts.
Figure 4:
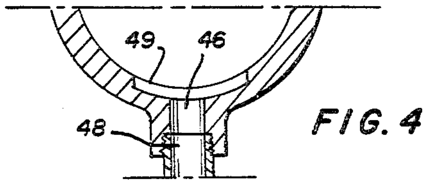
FIGURE 4 is a fragmentary sectional detail illustrative of one mode of forming a port in a cylinder wall, as taken from the indicated line 4—4 at FIG. 2, but on an enlarged scale.

Reference is made first to FIGS. 1 to 4 of the drawing which illustrate the improved opposed piston engine E–1 having intake and outlet ports arranged to permit the engine to be driven by compressed air or by steam. This engine is illustrated and herein described as a single cylinder, vertical-shaft unit since a showing of a multi-cylinder unit would be an unnecessary duplication of components. The cylinder 30, of a standard type of construction having a smooth bore and suitable cooling fins as illustrated, is adapted to connect with a crankcase 31 at each end thereof by a ring of bolts, or otherwise in any conventional manner.

Each crankcase 31 is also conventional in its basic construction, being as an enclosed unit having a base portion 32 and a body portion 33 interconnected together. The base portions 32 are secured to a common mounting plate 34 and the body portions connect with the ends of the cylinder. Shaft bearings, not shown, support a crankshaft in each crankcase and these crankshafts are aligned in mutual spaced parallelism to rotate in unison.

In the drawing, the crankshaft at the right hand side may be designated as the primary crankshaft P and the one at the left hand side as the secondary crankshaft S, since the secondary crankshaft supplements the operation of the primary crankshaft P. Each crankshaft includes a crank arm 35 and a counterbalance 36 within the case in a conventional arrangement. The main shaft of each crankshaft extends above the upper side of the housing to carry a flywheel 37 and the shaft extends from the lower, opposite side to connect with a sprocket 38. The sprockets 38 are interconnected by a chain 39 in such a manner as to place the cranks out of phase, with the secondary crankshaft S leading the primary crankshaft by 90 degrees, as will be hereinafter described. One of the crankshafts, preferably the primary crankshaft P, includes an extension stub 40 which is adapted to connect with a driveshaft or the like to drive the mechanisms to which the engine is connected.

Each crank arm 35 carries a connecting rod 41 which connects to its piston by a wristpin 42. The piston 43 of the primary crankshaft P and the piston 44 of the secondary crankshaft S are essentially conventional in their constructions, excepting that the skirts of each will be varied in length to cover selected ports during the operative cycles as will be described.

The operation of this engine E–1 with compressed air or steam requires an inlet port 45 in the wall of the cylinder 30 near the center of the cylinder, and an exhaust port 46 in the wall of the cylinder near the base of the cylinder adjacent to the crankcase of the primary crankshaft P, as illustrated at FIG. 2. Each port is adapted to be closed by movement of the piston skirt over it and to be open whenever the face of the piston is moved away from the port and towards its crankcase. The inlet port 45, in the construction illustrated, is positioned to open when the crankshaft S moves 90 degrees past top dead center. This port remains open until the crank moves to the opposing position, 270 degrees past top dead center. Then, the port is closed by the skirt of piston 44 as the crankshaft moves 270 degrees to top dead center and thence, therepast 90 degrees. The exhaust port 46, located near the base of the cylinder, is normally closed by the elongated skirt of the piston 43 and opens by movement of the face of the piston therepast as the primary crankshaft moves to bottom dead center and again closes as the crankshaft moves past bottom dead center.

The engine is driven by compressed air or steam and a pressure supply line 47 connects with the inlet port 45 to provide the same from any conventional source. Also, an exhaust line 48 may connect with the exhaust port 46. These lines may be of any suitable diameter to adequately handle the gases which flow through them and to provide more effective exhaust from the cylinder, the exit of the port may be circumferentially extended about this cylinder wall through an arcuate slot 49 as in the manner illustrated at FIG. 4. The exhaust line 48 is not illustrated in its full extent since it may terminate at any suitable point, connect with a condenser or be completely eliminated where it is permissible to blow the exhaust directly into the atmosphere.

To complete the basic arrangement of this unit, various accessory items may be included. A chain tightener 50 may be affixed to the underside of the mounting plate 34 as in the manner illustrated at FIG. 3. To adjust the phase of one crank with respect to the other, a yoke 51 may be formed on the hub of one sprocket 38, a pair of opposing set screws 52 in this yoke extend to a shaft spline 53 to rotatively shift the position of the sprocket on the crankshaft. This, or any other suitable shifting arrangement, can be advantageously used to vary the compression ratio of the engine as will be hereinafter described.

Other modifications, not shown, may be incorporated into the engine. For example, the intake line may include a valve adapted to cut off the inflow of compressed air or steam during the latter portion of the work cycle, and while the cylinders are still moving apart, in order to take advantage of the work available in the natural expansion of the compressed air or steam, and to permit it to be exhausted at a reduced pressure.

Figure 5:
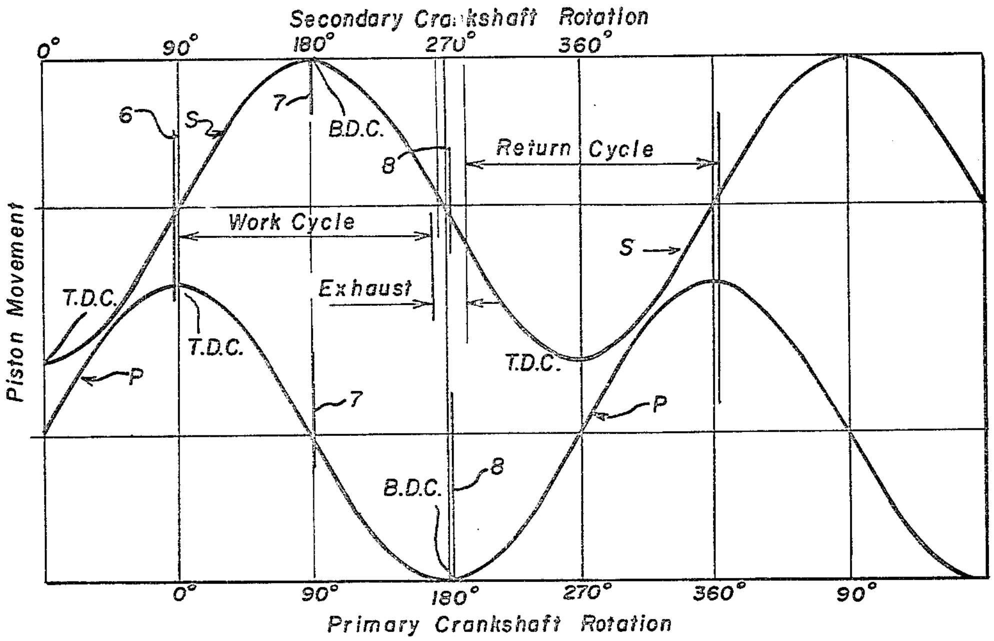
FIGURE 5 is a diagrammatic chart illustrating the comparative piston movements of the engine as the cranks are rotated and with dimension lines indicating cyclic sequences for operation of the engine with compressed air or steam.

The diagram at FIG. 5 shows the movement of the pistons 43 and 44. The curves, P representing movements of the primary piston 43, and S, representing movements of the secondary piston 44, are essentially sinusoidal in form and repeat with each 360-degree rotation of the crankshafts, with the secondary crankshaft leading the primary crankshaft by 90 degrees. The ordinate between the curves P and S shows the distance the faces of these pistons are spaced apart and thus, the comparative volume in the cylinder between the pistons varies as the primary and secondary crankshafts are rotated. Because of the 90 degree lead of the secondary crankshaft, the top dead center positions of each piston, indicated as TDC, lap each other and the closest position between the pistons is between these lapped positions at approximately 45 degrees past top dead center of the secondary piston movement, and 45 degrees before top dead center of the primary piston movement. On the other hand, while the furthest-apart position of the pistons is approximately 45 degrees past bottom dead center of the secondary piston and 45 degrees before bottom dead center of the primary piston, it is to be noted that the distance between the pistons does not greatly decrease until the primary piston is at bottom dead center, indicated BDC.

In an ideal arrangement, the work cycle would be between these extreme 45 degree positions above mentioned; however, where the inlet and exhaust are fixed ports in the cylinder wall as heretofore described, such is not practical and instead, the work cycle is established by the secondary crankshaft moving its piston 44 between 90 degrees and 270 degrees past top dead center, while exhaust occurs when the primary piston is at its bottom dead center position as the work cycle is completed. This slight shift from the ideal operational arrangement does not impair the efficiency of the engine operation, but does reduce its rated output slightly.

Figure 6:
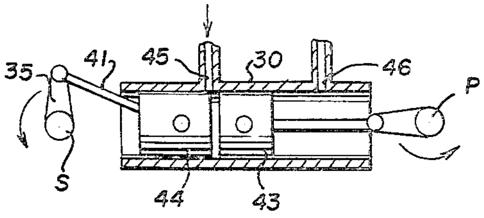
FIGURES 6 through 9 are small-scale diagrammatic sketches of the engine shown at FIGS. 1 to 4, to depict the several positions of the pistons during operation of the engine by compressed air or steam.
Figure 7:
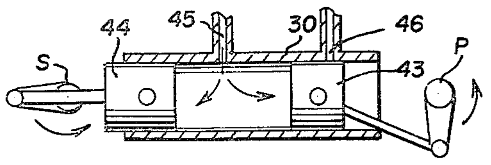
Figure 8:
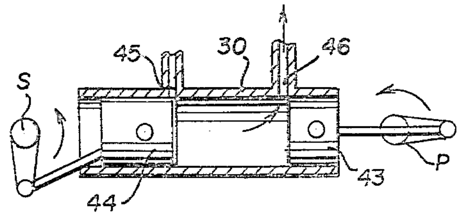
Figure 9:
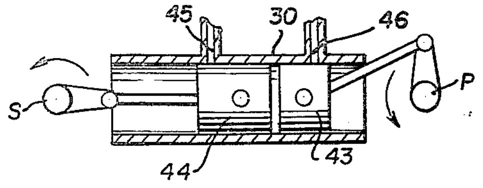

FIGURE 6 illustrates the position of the pistons 43 and 44 at the commencement of the work cycle indicated at line 6 at FIG. 5. FIGURE 7 illustrates the position of the pistons during the work cycle and when the secondary piston is at bottom dead center, indicated at line 7 at FIG. 5. FIGURE 8 illustrates the position of the pistons as exhaust and termination of the work cycle occurs, indicated by line 8 at FIG. 5.

After exhaust, the pistons move through a return cycle where neither the inlet nor exhaust ports are open and during this movement, some compression of the air or steam remaining in the cylinder will occur. The extent of such compression will not be significant during this return cycle and as soon as the secondary piston moves 90 degrees past top dead center, the work cycle recommences.

It is contemplated that the flywheels 37 will have sufficient inertia and momentum to permit the crank shafts to smoothly roate through this return cycle, and it is to be noted that where the engine is composed of two or more cylinders, no problem will exist because the cranks can be timed to provide a substantially continuous driving torque upon the engine shafts.

Figures 10, 11, 12:
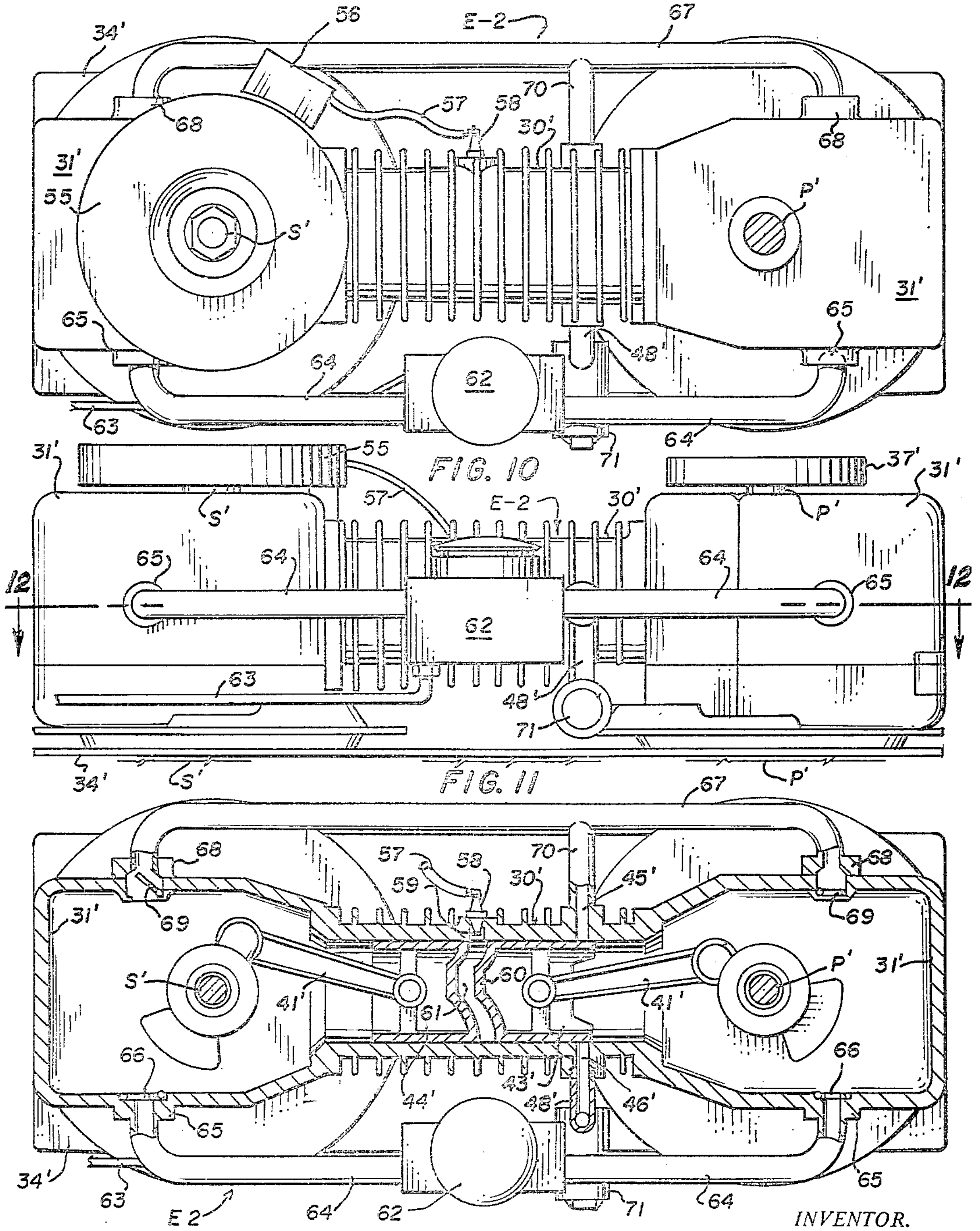
FIGURE 10 is a plan view of a single cylinder opposed piston engine similar to the showing at FIG. 1, but modified to operate as a two cycle internal combustion engine of a type which does not use poppet valves, but relies upon exhaust and intake ports in the cylinder.
FIGURE 11 is a side elevational view of the engine shown at FIG. 10, but with the driveshaft interconnect mechanism at the bottom of the engine being broken away to conserve space.
FIGURE 12 is a sectional plan view as taken from the indicated line 12—12 at FIG. 11 and with the pistons at the firing position.

The opposed piston engine E–2 illustrated at FIGS. 10, 11 and 12, is arranged to operate as a two-cycle internal combustion engine having no poppet valves, but only ports in the cylinder wall. Certain basic components are substantially the same as those heretofore described. The cylinder 30' has a crank case 31' at each end thereof which is mounted upon a plate 34' with the primary crankshaft P' and secondary crankshaft S' extending below this plate and being interconnected as by a sprocket-chain arrangement as heretofore described.

While one crankshaft may carry a flywheel 37' on the extension opposite the mounting plate, the other is arranged to carry a magneto 55 which is operatively associated with an electrical pickup 56 of a conventional construction and which is timed with respect to the shaft rotation to spark to properly fire the compressed fuel-air mixture. The pickup will thus include a lead 57 to connect with a sparkplug 58 in an offset socket 59 in the cylinder wall at a position where the plug is not in the way of the moving pistons.

Each crankshaft carries a connecting rod 41' which connects with its respective primary piston 43' and secondary piston 44'. In accordance with conventional two-cycle engine design, the inlet port 45' and exhaust port 46' operate simultaneously, at the bottom dead center position of the primary piston, and with these ports being diametrically opposed. Hence, the air-fuel inflow into the piston must be arranged to scavenge the exhaust. This is accomplished in a conventional manner by providing a ridge 60 on the face of the primary piston 43' which traverses the piston between the diametrically opposed inlet and exhaust ports. Complementary of the ridge, the face of the secondary piston 44' is formed with a transversely disposed valley 61, as illustrated at FIG. 12.

The opposing crank cases 31' are used as pumps to provide a pressurized flow of fuel gas to the cylinder when the inlet port 45' is opened, in accordance with the conventional operation of two-cycle, internal combustion engines. In this arrangement, a carburetor 62, having a gasoline feedline 63 and a two-branch intake line 64 extending to each crankcase, is mounted on one side of the engine. Each branch of the intake line connects to the side of the crankcase as in a lug 65. A check valve 66, to direct flow into the crankcase, is located at the exit of the intake line, within the crankcase.

The intake line is continued from each crankcase as an intake manifold 67, each end connecting to crankcase side wall at a lug 68. A check valve 69, to direct flow from the crankcase, is located at the entrance to the manifold. This manifold is completed by an intake branch 70 connecting directly to the cylinder intake port 45'.

To complete the engine E–2, the exhaust line 48' may extend to a suitable muffler 71 of conventional construction, to complete the basic arrangement.

Figure 13:
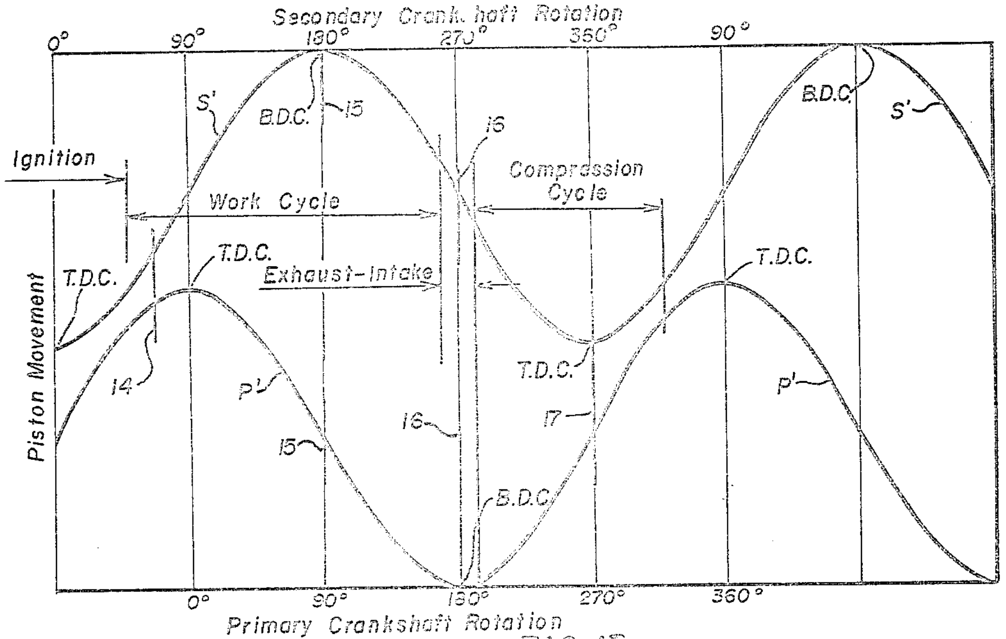
FIGURE 13 is a diagrammatic chart illustrating the comparative piston movements of the engine illustrated at FIGS. 10, 11 and 12 as the cranks are rotated and with dimension lines indicating cyclic sequences for operation as a two cycle internal combustion engine.

Operation of this two-cycle engine is depicted at FIG. 13 which shows the spacing and movements of the faces of the pistons 43' and 44' in an arrangement similar to that shown at FIG. 5. The work cycle commences with the ignition point, near 45 degrees past top dead center of the secondary piston and 45 degrees before top dead center of the primary piston, where the pistons are closest together and the fuel-air mixture is at maximum compression. The work cycle continues for approximately 225 degrees of crankshaft rotation until the primary piston reaches bottom dead center, whereupon simultaneous exhaust and intake occur. Thereafter, a compression cycle commences and continues for approximately 135 degrees of crankshaft rotation until the compression is at a maximum and the work cycle is repeated.

This two-cycle piston movement to drive the engine is accomplished by pumping action within the crankcases 31' and whenever a piston is moving towards its top dead center, it is pulling a fuel-air mixture into the crankcase from the carburetor by the opening of check valves 66. Whenever the pistons are moving away from top dead center, the fuel-air in each crankcase is pumped into the intake manifold 67 and compressed therein and compressed in the primary crankcase, to be released into the cylinder as soon as the inlet port opens.

Figure 14:
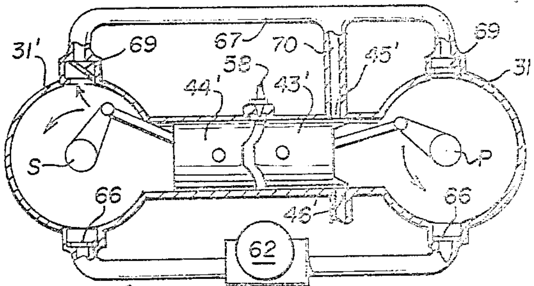
FIGURES 14 through 17 are small-scale, diagrammatic sketches of the engine shown at FIGS. 10, 11 and 12 to depict the several positions of the pistons during the operation of the engine as a two-cycle internal combustion engine.
Figure 15:
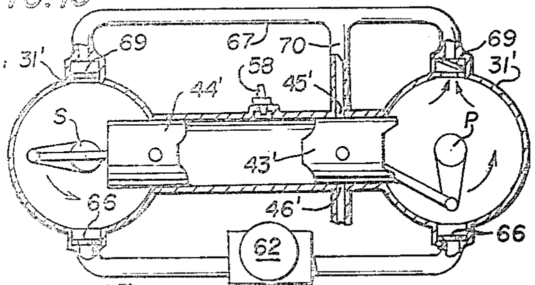

These various movements are illustrated at FIGS. 14 through 17. FIGURE 14 illustrates the position of the pistons 43' and 44' at the beginning of the work cycle shortly after ignition has occurred, and when the secondary piston is 60 degrees past top dead center and the primary piston is 30 degrees before top dead center, as in the position indicated at line 14 at FIG. 13. FIGURE 15 illustrates the position of the pistons during the work cycle when the secondary piston is at bottom dead center and the primary piston is 90 degrees past top dead center as at the line 15 at FIG. 13.

Figure 16:
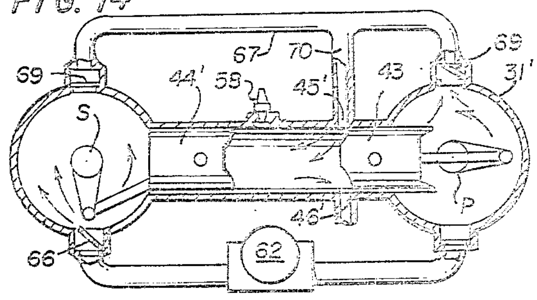

FIGURE 16 illustrates the position of the pistons at the end of the work cycle when the secondary piston is 90 degrees before its top dead center and the primary piston is at bottom dead center as at line 16 at FIG. 13. When in this position, the simultaneous intake and exhaust action occurs to scavenge and recharge the piston to permit a new compression cycle to start.

Figure 17:
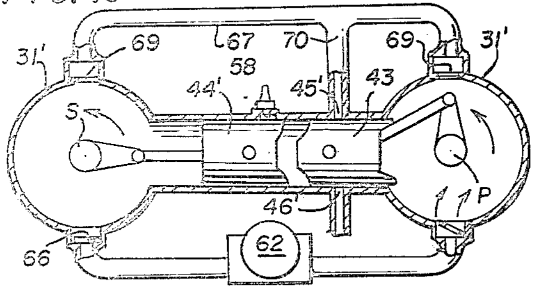

FIGURE 17 illustrates the position of the pistons during the compression cycle as when the secondary piston is at top dead center and the primary piston is 90 degrees before top dead center. It is to be noted that this compression will continue to maximum compression when the secondary piston is approximately 45 degrees past top dead center and the primary piston is 45 degrees before top dead center at which time ignition will again take place to initiate another work cycle. It is to be observed that when this compression action commences, the pistons are both at the right hand side of the cylinder and both shift across the cylinder so that the entire charge of gas is shifted within the cylinder to a point near the center of the cylinder where ignition takes place. This movement effects a preconditioning of the fuel gas mixture by creating turbulence and producing a better vaporized mix. It is also to be noted that during the later portion of the work cycle, past the point of maximum expansion, the gas is slightly compressed before exhaust commences and this slight compression portion of the cycle of rotation, from approximately 45 degrees prior to bottom dead center of the primary piston to bottom dead center, permits the fuel to more completely burn and thus, minimizes the presence of undesirable exhaust gas fumes.

The operation of the two-cycle engine illustrated at FIGS. 13 to 15 can be modified to place the exhaust at the bottom dead center of the secondary piston and intake at a port which is not only diametrically opposite to the exhaust port, but near the opposite end of the cylinder. This modification will require an intake valve in the engine to supplement the movements of the opposed pistons, as in the manner illustrated at FIG. 18. This opposed-piston, two-cycle engine E–3 is arranged with its basic components substantially the same as those heretofore described. The cylinder 30″ has a crankcase 31″ at each end thereof, which are mounted upon a plate with the primary crankshaft P″ and secondary crankshaft S″ extending below this plate and being interconnected as by a sprocket-chain arrangement not shown at FIG. 18 since it is the same as heretofore described. One crankshaft may carry a flywheel and the other a magneto and a pickup which is timed with respect to the shaft rotation to spark at the beginning of the work cycle. The pickup includes an electrical lead 57″ to connect with a sparkplug 58″ in an offset socket 59″ in the cylinder wall, the same as heretofore described.

Figure 18:
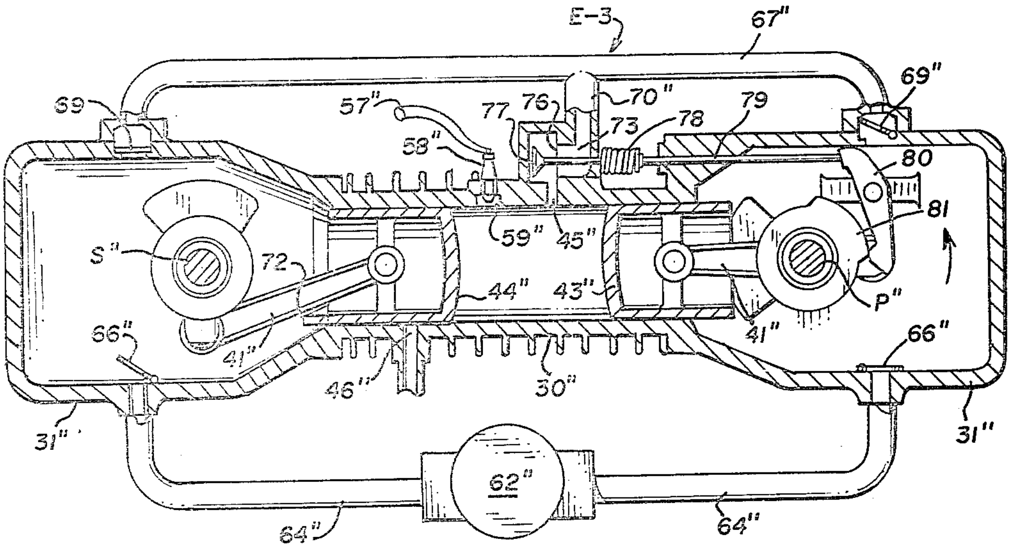
FIGURE 18 is a sectional plan view of a single cylinder, two cycle, opposed-piston engine similar to the view shown at FIG. 12, but with the pistons positioned as at the termination of the intake cycle and illustrating the engine having a modified port arrangement and having a poppet valve at the intake to modify the operative characteristics of the engine.

As further illustrated at FIG. 18, each crankshaft carries a connecting rod 41″ which connects with the respective primary piston 43″ and secondary piston 44″. However, in contrast with the two-cycle engine illustrated at FIGS. 10 to 12, this modified engine, illustrated at FIG. 18, need not have special constructed piston faces since the inlet port 45″ will be located at any suitable position near the center of the cylinder while the diametrically opposing exhaust port 46″ may be located in the cylinder wall adjacent to the face of the secondary piston 44″ to be opened when that piston is at its bottom dead center position. An extension 72 may be formed at the base of the skirt of the piston 44″ to cover this port when the piston is at top dead center to prevent loss of gas from the crankcases 31″ since they will be used to pump a fuel-gas into the cylinder the same as heretofore described.

The opposing crankcases 31″ are used as pumps to provide pressurized flow of fuel-gas to the cylinder and the inlet system includes a carburetor 62″ with the intake line 64″ extending to each crankcase and controlled with a check valve 66″ to direct flow into the crankcase. The intake line section, continuing from each crankcase as a manifold 67″ including check valves 69″ directs flow from the crankcases and into the manifold.

In this modified unit illustrated at FIG. 18, the manifold is completed by a branch 70″ having an enlarged chamber 73 therein contoured to form a valve seat 76 traversing the passageway 70″. A conventional poppet valve 77 is mounted within the chamber with its stem extending therefrom through a conventional type of passageway. This valve is urged against the seat by a spring 78. It is lifted through a mechanism train consisting of a tappet rod 79 extending from the end of the stem and into the primary chamber, a rocker arm 80 mounted upon a pivot within the chamber and a cam 81 on the shaft P″ which contacts an end of the rocker arm.

Figures 19, 20, 21, 22, 23:
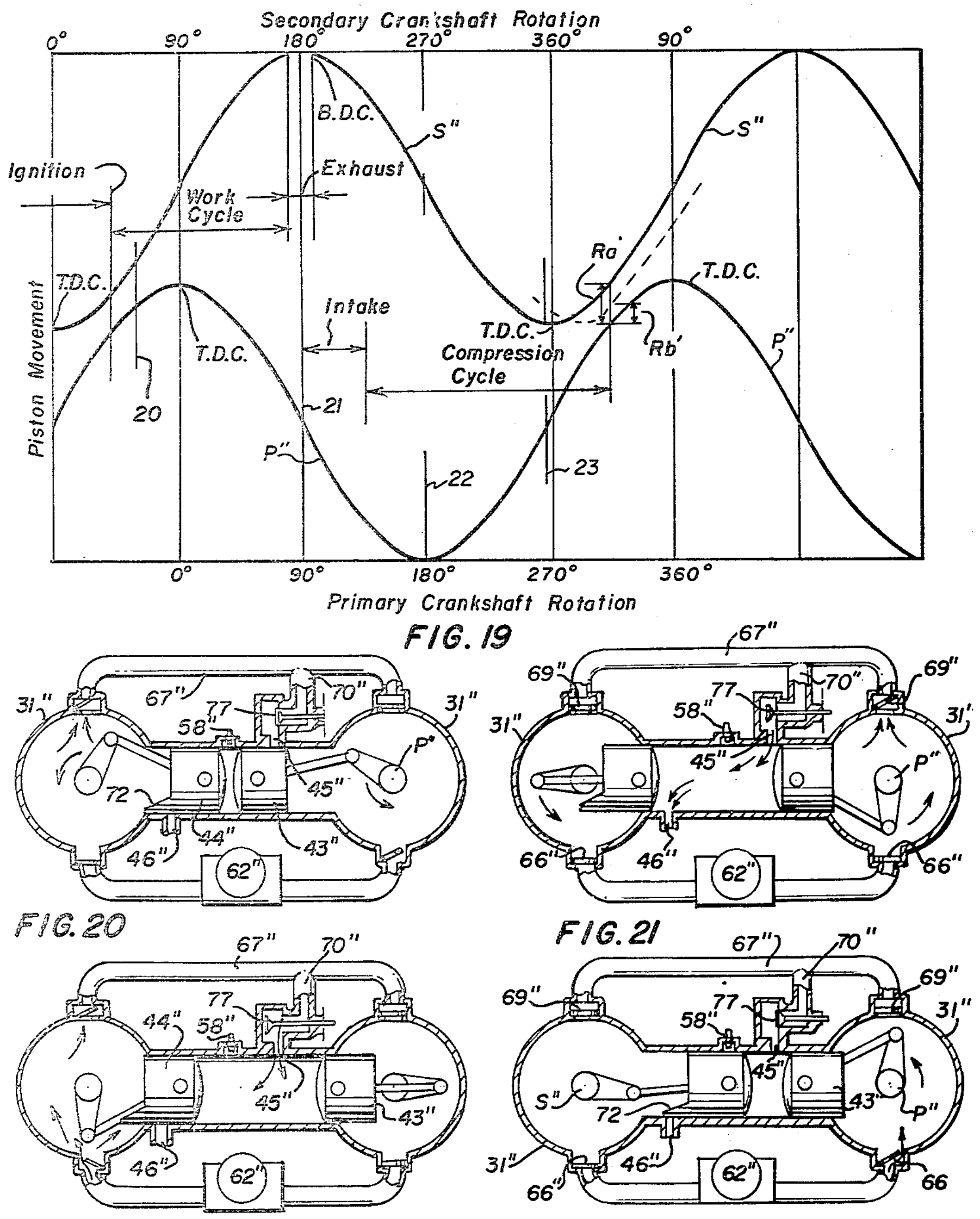
FIGURE 19 is a diagrammatic chart illustrating the comparative piston movements of the engine illustrated at FIG. 18 as the cranks are rotated, and with dimension lines indicating cyclic sequences for operation of the engine.
FIGURES 20 through 23 are small-scale diagrammatic sketches of the engine shown at FIG. 19 to depict the several positions of the pistons during the operation of the engine as a two-cycle internal combustion engine.

Operation of this two-cycle engine is depicted at FIG. 19 which shows the spacing and movements of the pistons 43″ and 44″ in an arrangement similar to that shown at FIGS. 5 and 13. The work cycle commences with the ignition at a point near 45 degrees past top dead center of the secondary piston and 45 degrees before top dead center of the primary piston, where maximum compression occurs. The work cycle continues through 135 degrees to the point where the secondary piston is at bottom dead center where the exhaust port is opened by the secondary piston. The intake, controlled by the valve 77, is then opened. The intake is continued for a substantial portion of piston rotation and terminated at any suitable time after the pistons are a maximum distance apart, as when the primary shaft is 45 degrees prior to bottom dead center, or thereafter, so long as the pressure within the primary crankcase is sufficient to force fuel gas into the cylinder between the pistons. As soon as the intake valve closes, the compression cycle commences and continues until the secondary piston is approximately 45 degrees past its top dead center position when ignition occurs and the work cycle is repeated.

Various positions of the pistons 43″ and 44″ during their movement are illustrated at FIGS. 20 through 23. FIGURE 20 illustrates the work cycle as it is commencing, with the secondary piston moved 60 degrees past top dead center and the primary piston 30 degrees before top dead center as at line 20 at FIG. 19. FIGURE 21 illustrates the exhaust position where the secondary piston is at its bottom dead center and the spent fuel is being exhausted, as at line 21 at FIG. 19. FIGURE 22 illustrates the engine a short time thereafter, when the secondary crankshaft is 90 degrees before top dead center and the intake action is being completed at line 22 at FIG. 19. FIGURE 23 illustrates the pistons moving together during the compression cycle with the secondary piston approaching top dead center as at line 23 at FIG. 19. This position is approximately 45 degrees before maximum compression and ignition will occur.

Figure 24:
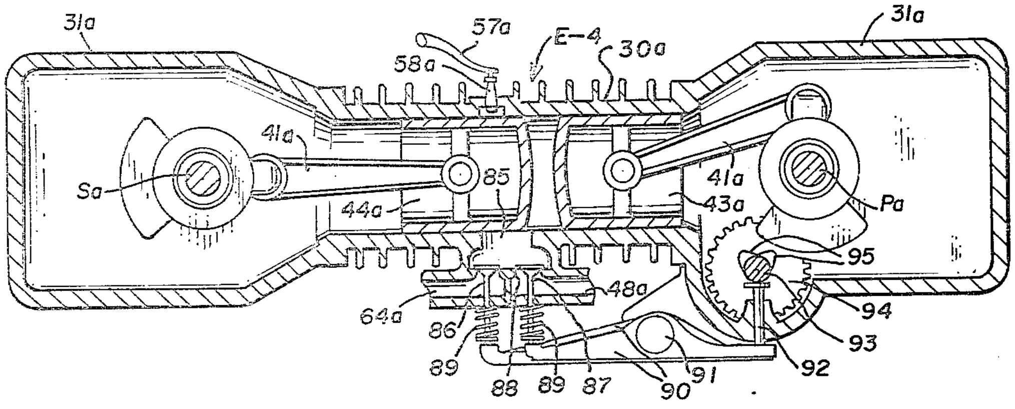
FIGURE 24 is a sectional plan view of a single cylinder, four-cycle, opposed piston engine similar to the view shown at FIG. 18, but with the pistons positioned as during the compression cycle and illustrating the engine as having poppet intake and exhaust valves for operation as a four-cycle machine.

The opposed piston engine can also be modified to function as a four-cycle engine by providing both intake and exhaust valves which are timed at selected positions during the crankshaft rotations. This engine E–4 is illustrated at FIG. 24, the piston movements at FIG. 25 and pertinent phases of its basic operation at FIGS. 26 through 29. The opposed-piston, four-cycle engine E–4 is arranged with its basic components substantially the same as heretofore described. The cylinder **30*a* has a crankcase 31*a*** at each end thereof, which are mounted upon a plate with the primary crankshaft P*a* and a secondary crankshaft S*a* extending below this plate and being interconnected by a sprocket-chain arrangement not shown at FIG. 24 since it is the same as heretofore described. One crankshaft may carry a flywheel and the other a magneto and a pickup which is timed with respect to shaft rotation spark at the beginning of the work cycle every other revolution. The pickup includes an electrical lead **57*a* to connect with a sparkplug 58*a* in an offset socket 59*a*** in the cylinder wall, the same as heretofore described.

As further illustrated at FIG. 24, each crankshaft carries a connecting rod **41*a* connecting with the respective primary piston 43*a* and secondary piston 44*a*. While individual ports may be used in this four-cycle engine, a single port chamber 85 is possible and this chamber must be located at the center of the cylinder and extend longitudinally a distance somewhat in excess of the total lapping movement of the pistons as each moves to and from its top dead center position. Carburation to supply a gas-air mixture may be in any conventional manner using a fuel supply line to a carburetor, not shown, with an intake 64 directed into one side of the chamber 85. An opposing exhaust line 48***a* extends from the opposite side of the chamber 85 to complete the system.

The intake line and the exhaust line are each closed by poppet valves 86 and 87 respectively. Each valve is mounted upon a seat 88 traversing the chamber 85 and the stem of the valve extends through the wall of the chamber and is tensed by a spring 89. Each valve is actuated by a rocker arm 90 mounted upon a shaft 91 on a bracket on the primary crankcase with the opposite end of each rocker arm connecting with the tappet rod 92 which extends through a passageway in the crankcase to contact a cam shaft 93. The cam shaft 93 is mounted within the crankcase 31*a* and is connected to the primary shaft P*a* by a gear 94 on the cam shaft and another gear, not shown, on the primary crankshaft. These gears rotate the cam shaft 93 at one-half the rotation of the crankshaft P*a* as is necessary for a four-cycle engine operation. Cam lobes 95 lift the tappet rods 92 at the proper timing for opening and closing of the valves 86 and 87. This valve arrangement is conventional to four-cycle engines and hence, need not be described in further detail.

Figures 25, 26, 27, 28, 29:
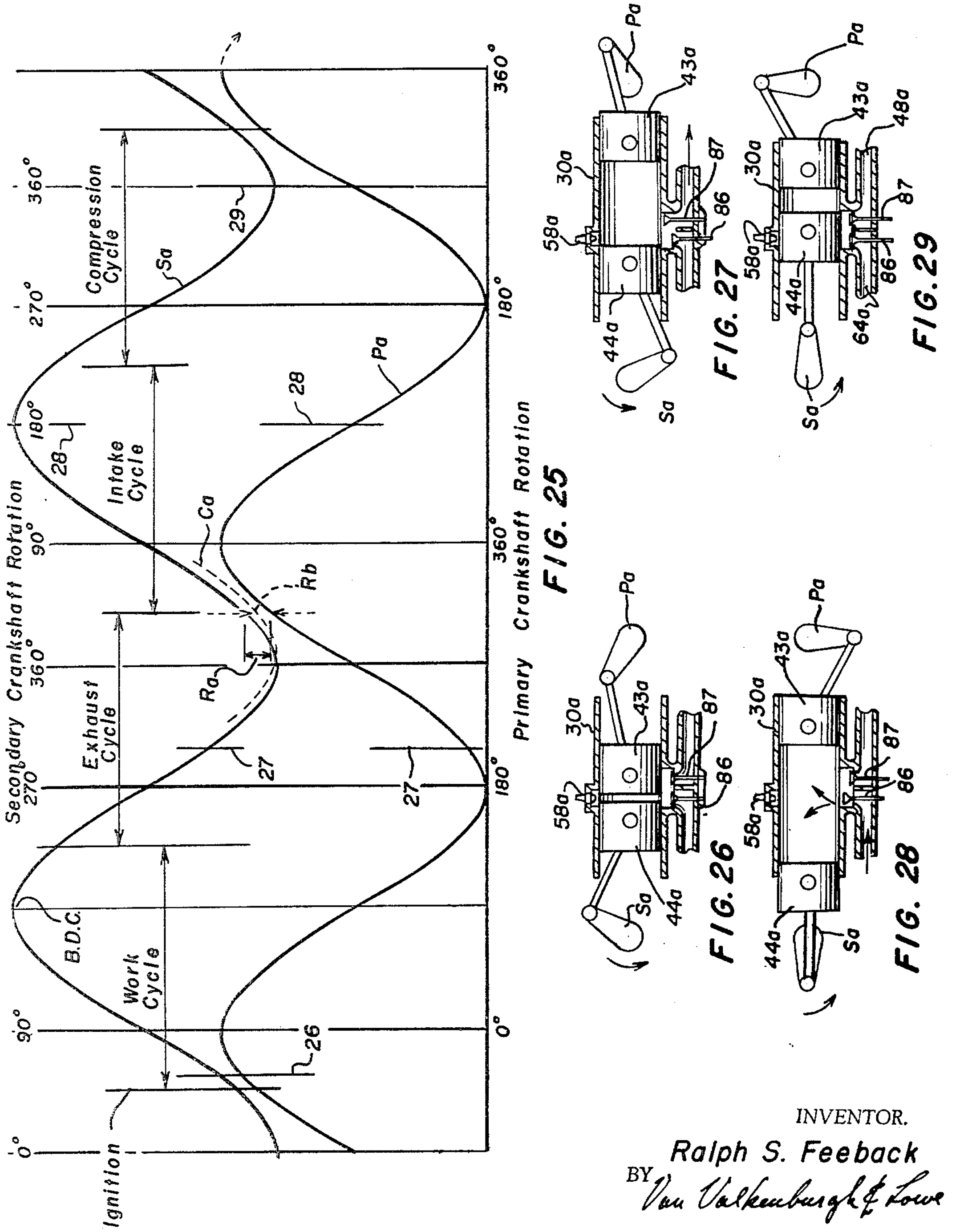
FIGURE 25 is a diagrammatic chart illustrating the comparative piston movements of the engine illustrated at FIG. 24 as the cranks are rotated through two complete revolutions, and with dimension lines indicating cyclic sequences for operation as a four-cycle internal combustion engine.
FIGURES 26 through 29 are small-scale diagrammatic sketches of the engine shown at FIG. 24 to depict the several positions of the pistons during operation of the engine as a four-cycle internal combustion engine.

Operation of this four-cycle engine is depicted at FIG. 25 which shows a spacing and movements of the faces of the pistons 43*a* and 44*a* in an arrangement similar to that shown at FIGS. 5, 13 and 19.

The work cycle commences with ignition at the point 45 degrees past top dead center of the secondary piston and 45 degrees before top dead center of the primary piston, where maximum compression occurs. The work cycle continues through a crankshaft rotation of approximately 180 degrees, approximately 45 degrees past bottom dead center of the secondary crankshaft. At this point, the pistons are furthest apart and the exhaust cycle commences by lifting the exhaust valve to permit the gas to escape from the unit. The exhaust cycle continues for approximately 180 degrees until the pistons move together to their closest point, approximately 45 degrees past top dead center of the secondary piston. At this point, the intake cycle commences and extends through a crankshaft rotation of approximately 180 degrees to the point approximately 45 degrees past bottom dead center of the secondary crankshaft. Thereafter, both valves close and the compression cycle commences to complete the operation.

In operation of this unit, it is to be noted that the gas flow will have a certain amount of inertia and in actuality, the ignition point may occur a few degrees before the point of maximum compression, the work cycle may terminate slightly before the point of maximum expansion occurs and the exhaust cycle and intake cycle may lap each other somewhat while the compression cycle may commence a few degrees beyond the point of maximum spacing of the pistons.

Various positions of the pistons 43*a* and 44*a*, during their movements, are illustrated at FIGS. 26 through 29. FIGURE 26 illustrates the pistons are together at a position where the secondary piston is approximately 60 degrees past top dead center and the work cycle is under way as indicated by the line 26 at FIG. 25. FIGURE 27 is with the secondary piston approximately 60 degrees before top dead center and the exhaust cycle is under way as indicated by the line 27 at FIG. 25. FIGURE 28 is with the secondary piston at bottom dead center and the intake cycle is nearly completed as indicated by the line 28 at FIG. 25. FIGURE 29 is with the secondary piston at top dead center and the compression cycle is nearly completed for ignition will occur when the pistons have moved approximately 45 degrees beyond this top dead center position of the secondary piston as indicated by the line 29 at FIG. 25.

One advantage of the internal combustion omnitorque opposed piston engine lies in the fact that the crankshafts can be easily adjusted to modify the compression ratio by the simple expedient of changing the phase of one crankshaft with respect to the other. This phase shift may be accomplished by adjusting the set screws 52 in an arrangement such as that illustrated at FIG. 3 and heretofore described. The effect is illustrated at the dotted line curve C″ at FIG. 19 and the dotted line curve C*a* at FIG. 25. In each instance, the dimension R*a* represents the spacing between the pistons at maximum compression when the phase difference is 90 degrees between the curves P″ and S″ or P*a* and S*a*. When a phase shift is made, such as that illustrated by the curves C″ and C*a*, the much smaller dimension R*b* exemplifies the increase in compression. This results from shifting the phase of the two crankshafts from 90 degrees to a slightly smaller angle. This advantage is quite manifest when it is recognized that the quality of various fuels available fluctuates to such an extent as to require different compression ratios for effective burning.

Figure 30:
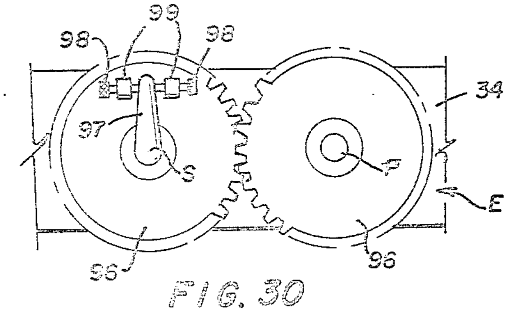
FIGURE 30 is a small-scale diagrammatic sketch of the underside of a machine similar to the showing at FIG. 3, but using gears to interconnect the driveshafts, and a means associated with the gears to vary the compression ratio of the engine.

Moreover, a simple and quick phase shifting arrangement is possible. FIGURE 30 shows a modified arrangement over the chain-sprockets illustrated at FIG. 3 where two meshing gears 96 are mounted upon each shaft P and S. One of the shafts includes a phase positioning arm 97 extending laterally therefrom which is mounted between a pair of set screws 98 carried in lugs 99 in a manner similar to that illustrated at FIG. 3. This arrangement at FIGURE 30 causes the shafts to rotate in opposite directions instead of in the same direction as does the sprocket-chain arrangement. However, this is not a significant modification in the basic operation of the apparatus.

The phase shift of the two shafts may also be accomplished by other mechanisms, not shown, which can be adjusted while the engine is in operation. Such mechanisms can be found on other types of machinery and they may be either mechanically or electrically controlled, or can even be adapted to change automatically responsive to the speed of the engine. The advantage is obvious, for an engine may be started with the crankshafts in a position where the compression ratio is, say for example, 7 to 1. After it is running at high speed, a phase shift can then be made where the compression ratio increases to, say for example, 11 to 1, providing a substantial increase in power and efficiency in the engine output for the fuel being used.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. An omnitorque opposed piston engine comprising:

(a) a cylinder having a crankcase housing at each end thereof;

(b) a crankshaft rotatably mounted within each housing;

(c) a piston within each end of the cylinder having a connecting rod extending into the adjacent crankcase and connecting with the crankshaft for reciprocation within the cylinder as the crankshaft rotates, with the length of each connecting rod being such that the top dead center position of each piston is beyond the center of the cylinder and laps the top dead center position of the other piston;

(d) a positive interconnection between the crankshafts to rotate the crankshafts in unison and at the same speed with one crankshaft being constantly approximately 90 degrees out-of-phase with the other, whereby the trailing piston moves to its top dead center position as the leading piston moves away from its top dead center position with the pistons being at their closest-together position when the leading crankshaft is approximately 45 degrees past its top dead center position and the trailing crankshaft is approximately 45 degrees before its top dead center position;

(e) an inlet means in the cylinder adapted to receive a prime mover gas to permit the pressure of the prime mover gas to push the pistons apart from a close-together position to a separated position and as an incident thereof, to rotate the crankshafts to create a work cycle; and (f) an exhaust means in the cylinder adapted to release the prime mover gas from the cylinder upon completion of the work cycle.

2. In the engine defined in claim 1, including:

means associated with said positive interconnection adapted to vary the phase difference between the crankshafts whereby to change the spacing between the pistons when they are at their closest position to thus change the compression ratio of the engine.

3. In the engine defined in claim 2, wherein said positive interconnection includes:

gear means mounted upon each crankshaft, and wherein said varying means includes:

an adjustment on one shaft adapted to rotate the gear means about the shaft.

4. In the engine defined in claim 1, wherein said inlet means and exhaust means comprise:

ports in the wall of the cylinder which are adapted to be normally closed by the skirts of the pistons and to be opened as the pistons move past the ports and towards their bottom dead center position.

5. In the engine defined in claim 4, wherein:

the prime mover gas is a compressed gas;

the inlet means comprises a port in the cylinder wall adapted to be opened by movement of the leading piston when it moves at least approximately 45 degrees past its top dead center position; and the exhaust means comprises a port in the cylinder wall adapted to be opened by the trailing piston when it moves to its bottom dead center position.

6. In the engine defined in claim 5, wherein:

the intake port is positioned on the cylinder wall to be opened when the leading piston moves approximately 90 degrees past its top dead center.

7. In the organization set forth in claim 5, including a valve at the intake port.

8. In the engine defined in claim 1, wherein:

the intake and exhaust means comprise ports in the cylinder wall in diametric opposition adapted to be opened by the primary piston when it moves to its bottom dead center position.

9. In the engine defined in claim 8, wherein:

the prime mover gas is a fuel-air mixture:

a sparkplug is mounted in the wall of the cylinder at the position where the two pistons move to their closest-together position; and means for injecting a fresh charge of air-fuel mixture into the intake port as a previous burnt-out charge is exhausted from the exhaust port.

10. In the engine defined in claim 9, wherein the injection means comprises:

a carburator; and an intake line extending to a crankcase and from the crankcase to the intake port with check valves in the crankcase adapted to direct the flow of gas from the carburator into the crankcase and from the crankcase into the intake.

11. In the engine defined in claim 1, wherein:

the intake means includes a port into the cylinder having a valve in its passageway;

a means associated with a crankshaft adapted to actuate the valve to open and close it when the crankshaft is at selected positive positions;

the exhaust means includes a port in the cylinder adapted to be normally closed by the skirt of the leading piston and to be opened when this piston is at its bottom dead center;

wherein the prime mover gas is a burnable fuel-air mixture adapted to provide internal combustion; and ignition means in the wall of the cylinder adapted to ignite the same.

12. In the engine defined in claim 1, wherein the intake means and exhaust means include:

an intake passageway and an exhaust passageway;

a valve in each passageway adapted to normlly close the same;

a cam shaft means associated with one of the crankshafts adapted to open and close the valves in a selected sequence;

a carburator means associated with the intake line adapted to furnish an air-fuel mixture to the cylinder when the intake valve is opened and the pistons are moving apart to constitute an intake cycle; and an ignition means in the cylinder adapted to ignite the air-fuel mixture in the cylinder.

References Cited

UNITED STATES PATENTS

| | | |
|---|---|---|
| 1,689,419 | 10/1928 | Bronander. |
| 1,940,533 | 12/1933 | Cain. |
| 2,401,188 | 5/1946 | Prince. |
| 2,462,092 | 2/1949 | Gehrandt. |
| 2,486,185 | 10/1949 | Mallory. |
| 3,084,678 | 4/1963 | Lindsay. |

CORNELIUS J. HUSAR, Primary Examiner